US012178167B2

(12) United States Patent
Carter et al.

(10) Patent No.: US 12,178,167 B2
(45) Date of Patent: Dec. 31, 2024

(54) SURGE IRRIGATION SYSTEM AND METHOD OF USE

(71) Applicant: CJC Holdings, LLC, Logan, UT (US)

(72) Inventors: Clayton Reed Carter, North Logan, UT (US); E. Clay Slade, North Logan, UT (US); Brett Ray Thayne, Nibley, UT (US); Janos Lakatos, Mendon, UT (US); Kellyn Gene Merritt, Mendon, UT (US); Koby John Hale, Burley, ID (US); Nathan Gibbons Merrill, Logan, UT (US)

(73) Assignee: CJC Holdings, LLC, Logan, UT (US)

( * ) Notice: Subject to any disclaimer, the term of this patent is extended or adjusted under 35 U.S.C. 154(b) by 67 days.

(21) Appl. No.: 17/951,042

(22) Filed: Sep. 22, 2022

(65) Prior Publication Data

US 2023/0086588 A1 Mar. 23, 2023

Related U.S. Application Data

(60) Provisional application No. 63/247,786, filed on Sep. 23, 2021.

(51) Int. Cl.
*A01G 25/16* (2006.01)

(52) U.S. Cl.
CPC ......... *A01G 25/165* (2013.01); *A01G 25/162* (2013.01); *A01G 25/167* (2013.01)

(58) Field of Classification Search
CPC .... A01G 25/167; A01G 25/16; A01G 25/165; A01G 25/162
See application file for complete search history.

(56) References Cited

U.S. PATENT DOCUMENTS

| 2,248,381 | A | * | 7/1941 | Pedersen | F16K 1/02 |
|  |  |  |  |  | 251/264 |
| 2,539,076 | A | * | 1/1951 | Harris | E02B 13/02 |
|  |  |  |  |  | 137/445 |

(Continued)

FOREIGN PATENT DOCUMENTS

| CA | 3108011 A1 * | 3/2020 | ........... A01G 25/092 |
| CN | 106069630 A * | 11/2016 | |

(Continued)

OTHER PUBLICATIONS

"Nebraska-Lincoln" - Fundamentals of Surge Irrigation by University of Nebraska-Lincoln published on Jul. 2008 (Year: 2008).*

(Continued)

*Primary Examiner* — David Colon-Morales
(74) *Attorney, Agent, or Firm* — Preston P. Frischknecht; Project CIP

(57) ABSTRACT

A surge irrigation system with one or more valve location units configured for location at a flood irrigation valve assembly. Each valve location unit has an elongate linkage with a rod configured to rotatably open and close a flood irrigation valve assembly with a powered actuator. A control unit is connected to the powered actuator and configured to wirelessly receive instructions to operate the powered actuator. Various embodiments also implement a base station to relay information and/or instructions between valve location units and a user. A user may control the system through, for example, a mobile device interface. Embodiments of the invention may also include moisture sensors configured to provide feedback to the system. A method of using the surge irrigation system is also disclosed.

12 Claims, 19 Drawing Sheets

(56) References Cited

U.S. PATENT DOCUMENTS

| | | | | | |
|---|---|---|---|---|---|
| 2,646,076 | A | * | 7/1953 | Bonander | E02B 13/02 405/41 |
| 2,759,369 | A | * | 8/1956 | Ginocchio | F16K 31/56 251/232 |
| 3,114,243 | A | * | 12/1963 | Winters | E02B 13/00 137/625.42 |
| 3,845,788 | A | * | 11/1974 | Laven | F16K 31/05 137/897 |
| 4,209,131 | A | * | 6/1980 | Barash | G05D 22/02 239/69 |
| 4,220,313 | A | * | 9/1980 | Petersen | F16K 31/05 74/520 |
| 4,431,338 | A | * | 2/1984 | Hornabrook | E02B 13/00 405/36 |
| 4,464,079 | A | * | 8/1984 | Chance | E02B 13/00 405/36 |
| 4,535,813 | A | * | 8/1985 | Spain | A01G 25/162 137/625.5 |
| 4,577,802 | A | * | 3/1986 | Keller | E02B 13/00 239/69 |
| 4,673,128 | A | * | 6/1987 | Keller | E02B 13/00 239/69 |
| 4,676,264 | A | * | 6/1987 | Wiseman | F16K 11/085 137/119.07 |
| 4,699,354 | A | * | 10/1987 | Gibson | F16K 31/145 251/367 |
| 4,711,272 | A | * | 12/1987 | Wiseman | F16K 25/00 137/315.09 |
| 4,726,529 | A | * | 2/1988 | Nislar | A01G 25/09 239/536 |
| 5,667,336 | A | * | 9/1997 | Zur | E02B 13/00 405/39 |
| 5,813,655 | A | * | 9/1998 | Pinchott | A01G 25/165 251/288 |
| 6,109,827 | A | * | 8/2000 | Holloway, Jr. | E02B 13/00 47/79 |
| 6,427,718 | B1 | * | 8/2002 | Stringam | A01G 25/16 700/282 |
| 7,066,301 | B2 | * | 6/2006 | Oh | F16K 31/047 185/11 |
| 7,883,027 | B2 | * | 2/2011 | Fekete | G05B 15/02 700/19 |
| 7,930,069 | B2 | * | 4/2011 | Savelle, Jr. | A01G 25/167 700/19 |
| 8,225,810 | B2 | * | 7/2012 | Blanchard | A01G 25/167 239/69 |
| 8,457,799 | B2 | * | 6/2013 | Cox | A01G 25/167 239/69 |
| 8,671,969 | B2 | * | 3/2014 | Dresselhaus | F16K 37/0091 137/78.3 |
| 8,915,131 | B2 | * | 12/2014 | Aughton | G01N 33/246 73/152.01 |
| 8,948,921 | B2 | * | 2/2015 | Halahan | A01G 25/16 700/284 |
| 9,244,449 | B2 | * | 1/2016 | Tennyson | G05B 15/02 |
| 9,301,461 | B2 | * | 4/2016 | Woytowitz | A01G 25/16 |
| 9,408,353 | B2 | * | 8/2016 | Neesen | G06F 3/0484 |
| 9,684,312 | B1 | * | 6/2017 | Eyring | G01F 1/00 |
| 9,886,016 | B2 | * | 2/2018 | Bermudez Rodriguez | G05B 15/02 |
| 9,971,328 | B2 | * | 5/2018 | Kaminski | G05B 19/042 |
| 10,028,452 | B2 | * | 7/2018 | Workman | H04L 67/55 |
| 10,039,242 | B1 | * | 8/2018 | Goldwasser | H02S 99/00 |
| 10,076,089 | B2 | * | 9/2018 | Chitnis | G05B 19/042 |
| 10,113,287 | B2 | * | 10/2018 | Christiansen | E02B 5/082 |
| 10,194,598 | B2 | * | 2/2019 | Bauman | G05B 15/02 |
| 10,194,639 | B2 | * | 2/2019 | Jordan | A01G 25/16 |
| 10,254,728 | B2 | * | 4/2019 | Hill | A01G 25/167 |
| 10,327,397 | B2 | * | 6/2019 | Olive-Chahinian | A01G 25/16 |
| 10,337,642 | B2 | * | 7/2019 | Aughton | F16H 19/06 |
| 10,368,504 | B2 | * | 8/2019 | Sabadin | B05B 1/3026 |
| 10,444,769 | B2 | * | 10/2019 | Weiler | G05B 19/042 |
| 10,534,377 | B2 | * | 1/2020 | Dolezilek | H04L 12/42 |
| 10,548,268 | B1 | * | 2/2020 | Lu | A01G 25/023 |
| 10,588,273 | B1 | * | 3/2020 | Bishop | E02B 13/02 |
| 10,602,682 | B1 | * | 3/2020 | Wardle | A01G 25/165 |
| 10,624,280 | B2 | * | 4/2020 | Eyring | A01G 25/165 |
| 10,743,483 | B1 | * | 8/2020 | Melrose | G05B 19/042 |
| 10,757,873 | B2 | * | 9/2020 | Weiler | A01G 25/165 |
| 10,837,575 | B2 | * | 11/2020 | Heaney | B05B 12/087 |
| 10,918,029 | B2 | * | 2/2021 | Henry | F16L 41/023 |
| 10,966,380 | B1 | * | 4/2021 | Goldwasser | F16K 37/0025 |
| 10,968,589 | B2 | * | 4/2021 | Schafer | E02B 13/02 |
| 10,973,182 | B1 | * | 4/2021 | Bangerter | A01G 25/167 |
| 11,058,074 | B2 | * | 7/2021 | Huang | A01G 25/16 |
| 11,457,576 | B2 | * | 10/2022 | Huang | H04W 4/38 |
| 11,464,178 | B2 | * | 10/2022 | Motycka | A01G 25/167 |
| 11,503,782 | B2 | * | 11/2022 | Wlassich | A01G 25/167 |
| 11,825,779 | B2 | * | 11/2023 | Thatcher | A01G 25/092 |
| 11,828,633 | B2 | * | 11/2023 | Ishida | G01F 1/34 |
| 2005/0192710 | A1 | * | 9/2005 | Thornton | A01G 25/16 700/284 |
| 2011/0190947 | A1 | * | 8/2011 | Savelle, Jr. | A01G 25/16 700/284 |
| 2012/0175425 | A1 | * | 7/2012 | Evers | A01G 25/167 239/71 |
| 2012/0283853 | A1 | * | 11/2012 | Nibler | G05B 19/106 700/90 |
| 2014/0365021 | A1 | * | 12/2014 | Workman | A01G 25/16 324/546 |
| 2017/0367277 | A1 | * | 12/2017 | Mohindra | A01G 25/167 |
| 2018/0279566 | A1 | * | 10/2018 | Wlassich | A01G 25/162 |
| 2018/0325050 | A1 | * | 11/2018 | Bye | A01G 25/162 |
| 2019/0297797 | A1 | * | 10/2019 | Nickerson | A01G 25/165 |
| 2020/0232939 | A1 | * | 7/2020 | Nemecek | G06F 1/16 |
| 2020/0359580 | A1 | * | 11/2020 | Montgomery | H04W 4/80 |
| 2021/0045300 | A1 | * | 2/2021 | Ishida | A01G 25/02 |
| 2022/0357754 | A1 | * | 11/2022 | Yang | G05D 3/12 |
| 2022/0400632 | A1 | * | 12/2022 | Moeller | A01G 25/092 |
| 2022/0408665 | A1 | * | 12/2022 | Jackson | A01G 25/165 |

FOREIGN PATENT DOCUMENTS

| | | | | |
|---|---|---|---|---|
| CN | 107873486 A | * | 4/2018 | A01G 25/09 |
| CN | 110393140 A | * | 11/2019 | A01G 25/16 |
| CN | 210470577 U | * | 5/2020 | A01G 25/16 |
| DE | 102016109747 | | 12/2016 | |
| WO | WO-2005002321 A2 | * | 1/2005 | A01G 25/16 |

OTHER PUBLICATIONS

"Prshant Dinkar Borhade" - Smart Surge Irrigation Using Microcontroller Based Embedded Systems and Internet of Things by Prshant Dinkar Borhade published on Dec. 2018 (Year: 2018).*

"Allan Humpherys" - Surge Irrigation 1 An Overview by Allan Humpherys published on Aug. 1989 (Year: 1989).*

"CC Shock and T Welch" - Surge Irrigation by CC Shock and T Welch published on Jul. 2011 (Year: 2011).*

Mathew, A C et al.; Performance Evaluation of Two Automated Surge Irrigation Systems; Asian Association for Agricultural Engineering; Jan. 1, 2005, https://dialog.proquest.com/professional/docview/29561146/Record/182A89BA497F9F9C9D/1?accountid=157282; Abstract, THAILAND.

Amulya Ponnuru, et al., An Experimental Design Approach to IoT Enabled Smart Parallel Irrigation System Using Embedded Microcontrollers, Experimental Design, School of Electronics Engineering, Vellore Institute of Technology; May 1, 2021; http://ceur-ws.org/Vol-2875/PAPER_06.pdf; Abstact, pp. 67-68 & 73, India.

LSUAg, Demonstration of Integrated Irrigation Management to Improve Water and Nutrient Use Efficiency, Soil Health, and Water Quality in Furrow Irrigated Agriculture, https://www.nrcs.usda.gov/wps/PA_NRCSConsumption/download?cid=nrcseprd1501615&ext=pdf, Dec. 1, 2018; pp. 1 & 2, USA.

Holt, Jonathan, et al., Irrigation Advance Sensors are Having Large Impacts in Surface Irrigation, Utah State University, Jul 1, 2021,

(56) References Cited

OTHER PUBLICATIONS https://extension.usu.edu/crops/research/irrigation-advance-sensors-are-having-large-impacts-in-surface-irrigation, p. 1.

* cited by examiner

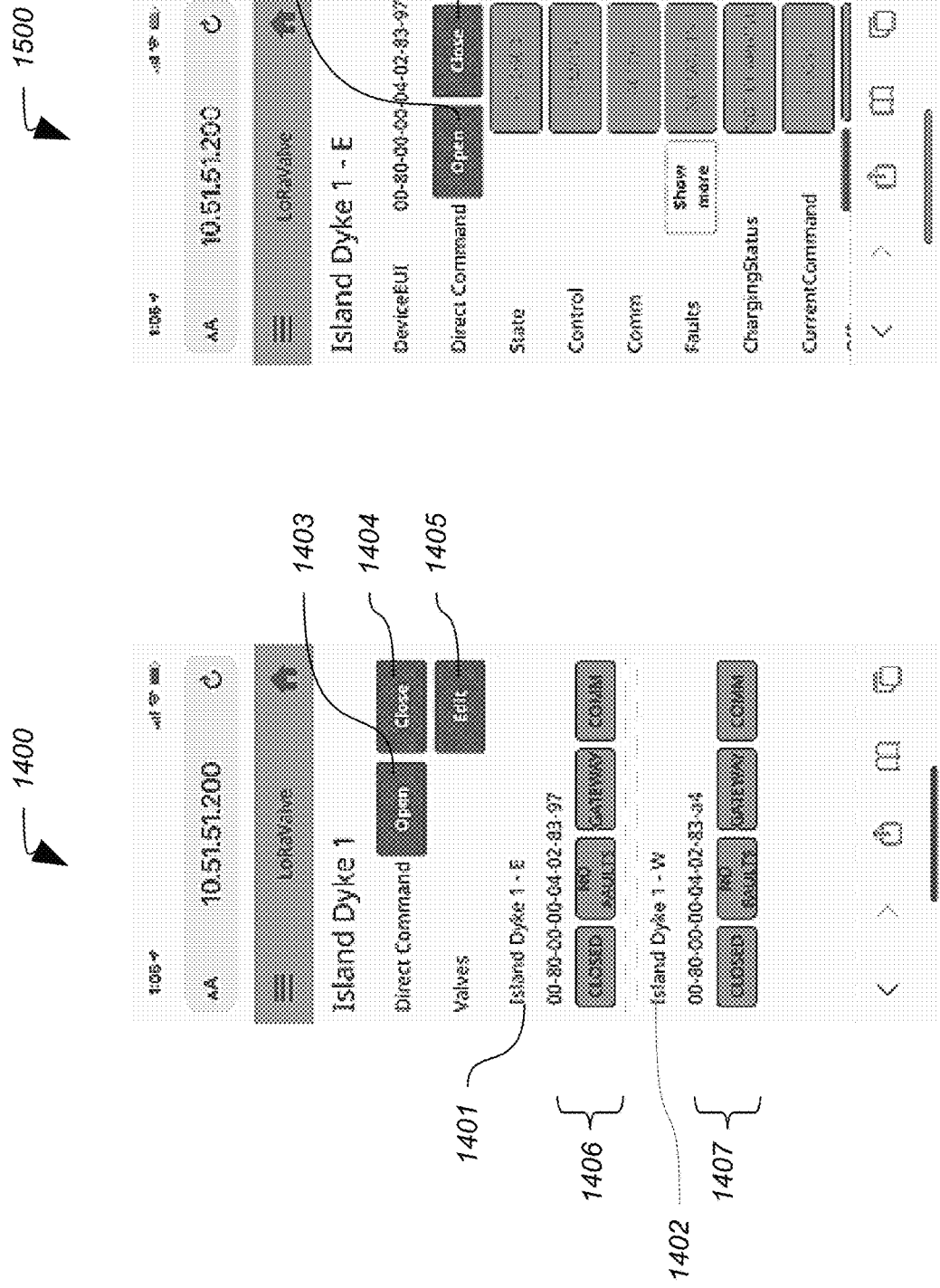

FIG. 22

SURGE IRRIGATION SYSTEM AND METHOD OF USE

RELATED APPLICATIONS

This application claims priority to provisional patent application No. 63/247,786, filed on Sep. 23, 2022, and incorporated herein.

BACKGROUND

Surge irrigation is relatively new with research and development into its practice and modelling started in early 1980s. Surge irrigation is a variant of flood irrigation where the water supply is pulsed on and off in planned time periods (e.g. on for 1 hour off for 1½ hour). The wetting and drying cycles reduce infiltration rates resulting in faster advance rates and higher uniformity than continuous flow. The reduction in infiltration is a result of surface consolidation, filling of cracks and micro pores and the disintegration of soil particles during rapid wetting and consequent surface sealing during each drying phase.

Numerous studies and papers document the advantages of surge over other forms of irrigation (and particularly flood)—including significantly increased water conservation and crop yield. More particularly, specific advantages include: (1) less deep percolation at the upper end of a field and more uniform percolation throughout the field; (2) reduction of tailwater; (3) lighter application of water with higher efficiency; (4) increased opportunity to store precipitation and reduce irrigation requirements; (5) reduction of water pumped and energy requirements for the same; and (6) increased opportunity for automation and less intensive irrigation labor. Such benefits are multiplied in arid and semi-desert environments where water scarcity represents a multi-faceted resource limitation.

Despite the obvious advantages of surge irrigation, there are significant limitations preventing its widespread adoption. For example, conversion of existing irrigation systems to those capable of surge irrigation is often daunting, expensive, and complicated. Because surge irrigation requires regularly pulsing water over varied irrigation areas, automation or semi-automation is needed to manage labor requirements. There are few aftermarket solutions that allow for relatively easy conversion and ease of operation. The stakes are particularly high given water scarcity and climate change trends. What is needed is a new, cost-effective aftermarket solution that provides ease of conversion and operation to implement surge irrigation methods.

SUMMARY OF THE INVENTION

In accordance with the above, a new surge irrigation system and method of use is provided. The surge irrigation system is configured to surge irrigate an area of land. Embodiments include one or more valve location units configured for location above a single flood irrigation valve assembly. Each valve location unit has an elongate linkage with a rod configured to rotatably open and close the single flood irrigation valve assembly with a powered actuator. A control unit is connected to the powered actuator and configured to wirelessly receive instructions to operate the powered actuator. Various embodiments also implement a base station to relay information and/or instructions between valve location units and a user. A user may control the system through, for example, a mobile device interface. Embodiments of the invention may also include moisture sensors configured to provide feedback to the system. A method of using the surge irrigation system is also disclosed.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which:

FIG. 14 is a fifth user interface in one embodiment of a surge irrigation system.

FIG. 15 is a sixth user interface in one embodiment of a surge irrigation system.

FIG. 22 is an eleventh user interface in one embodiment of a surge irrigation system.

DETAILED DESCRIPTION OF THE ILLUSTRATED EMBODIMENT

Figure 1:
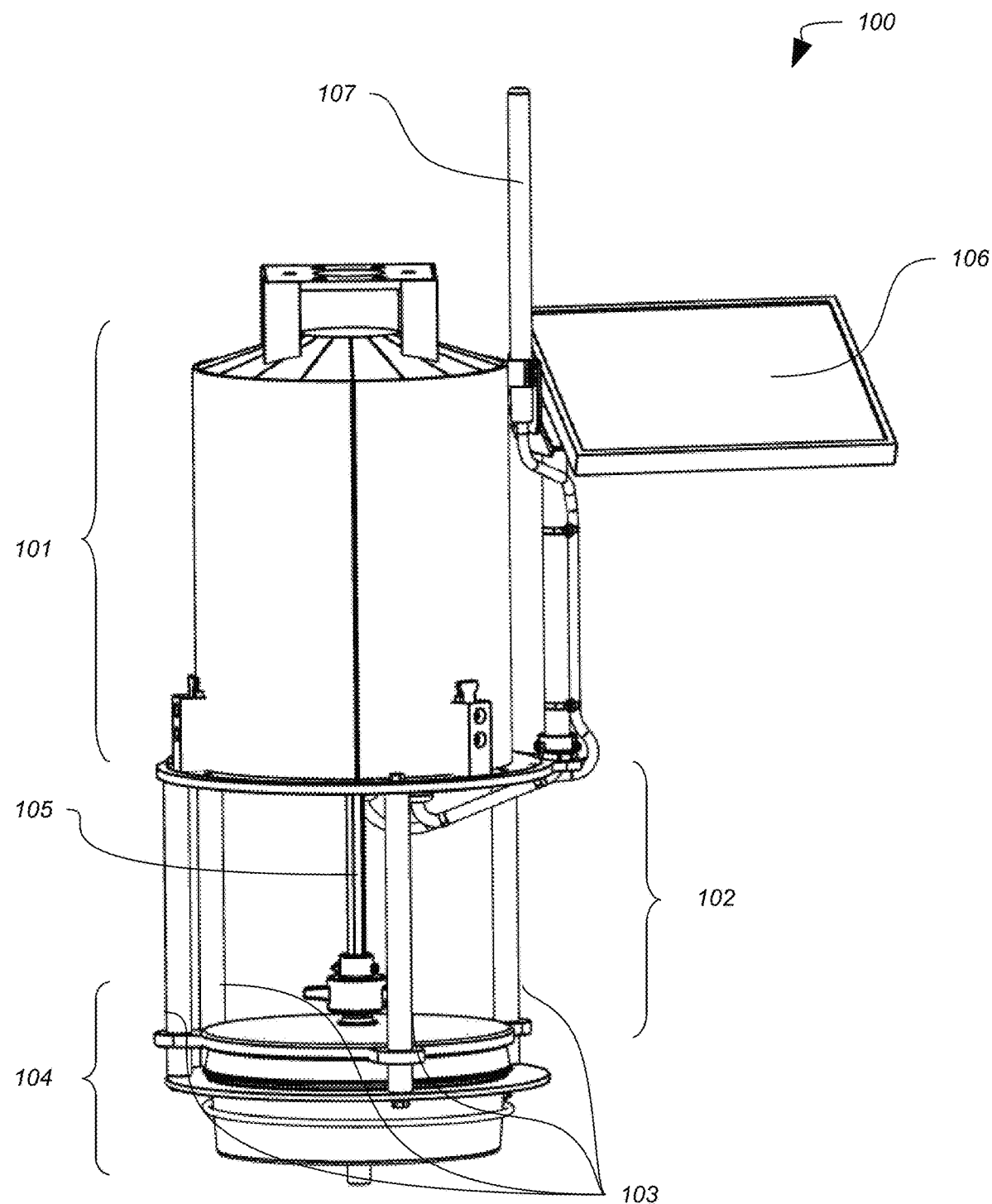
FIG. 1 is a perspective view of a valve location unit with valve assembly within one embodiment of surge irrigation system.
Figure 2:
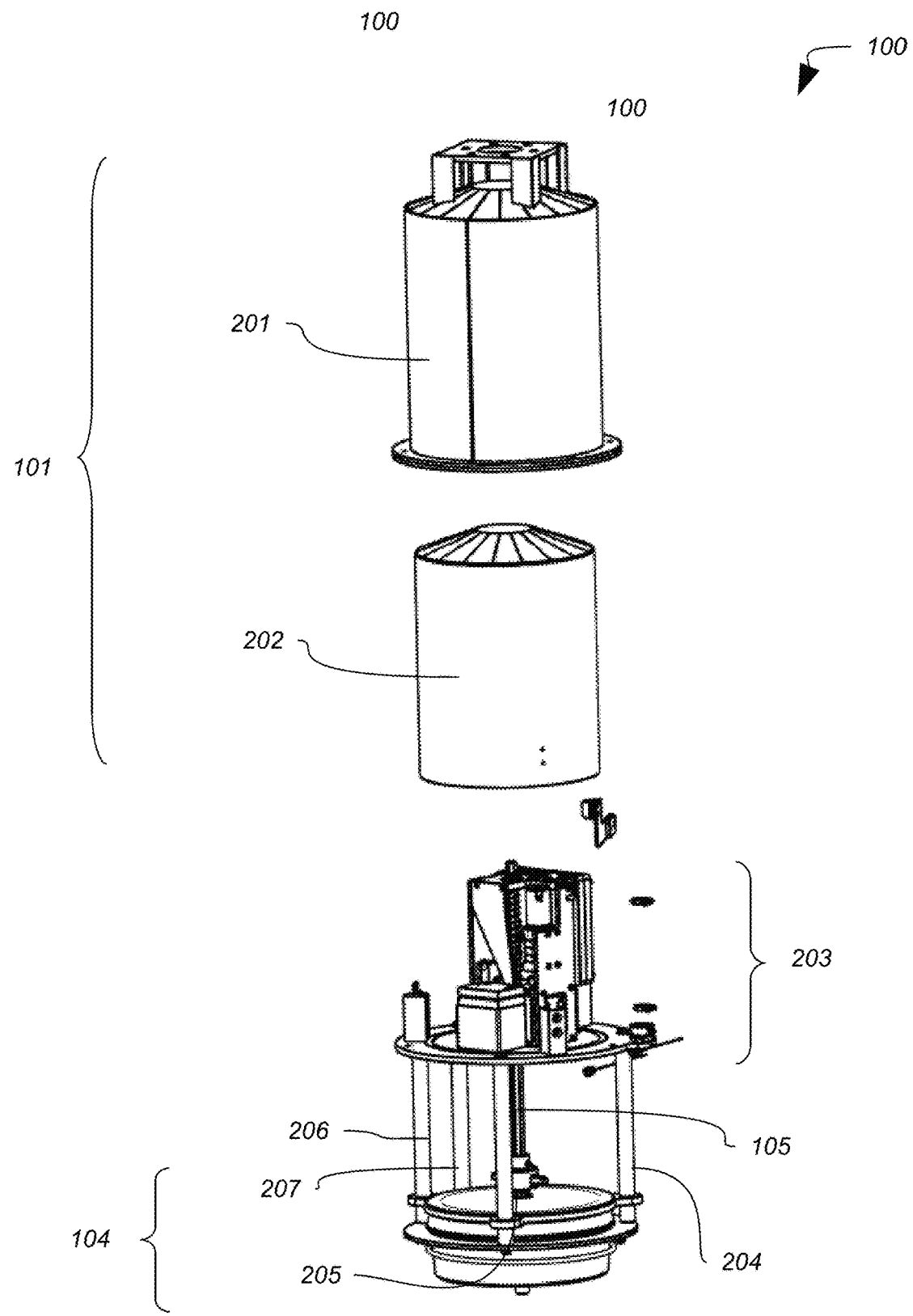
FIG. 2 is an exploded view of a valve location unit with valve assembly within one embodiment of a surge irrigation system.
Figure 3:
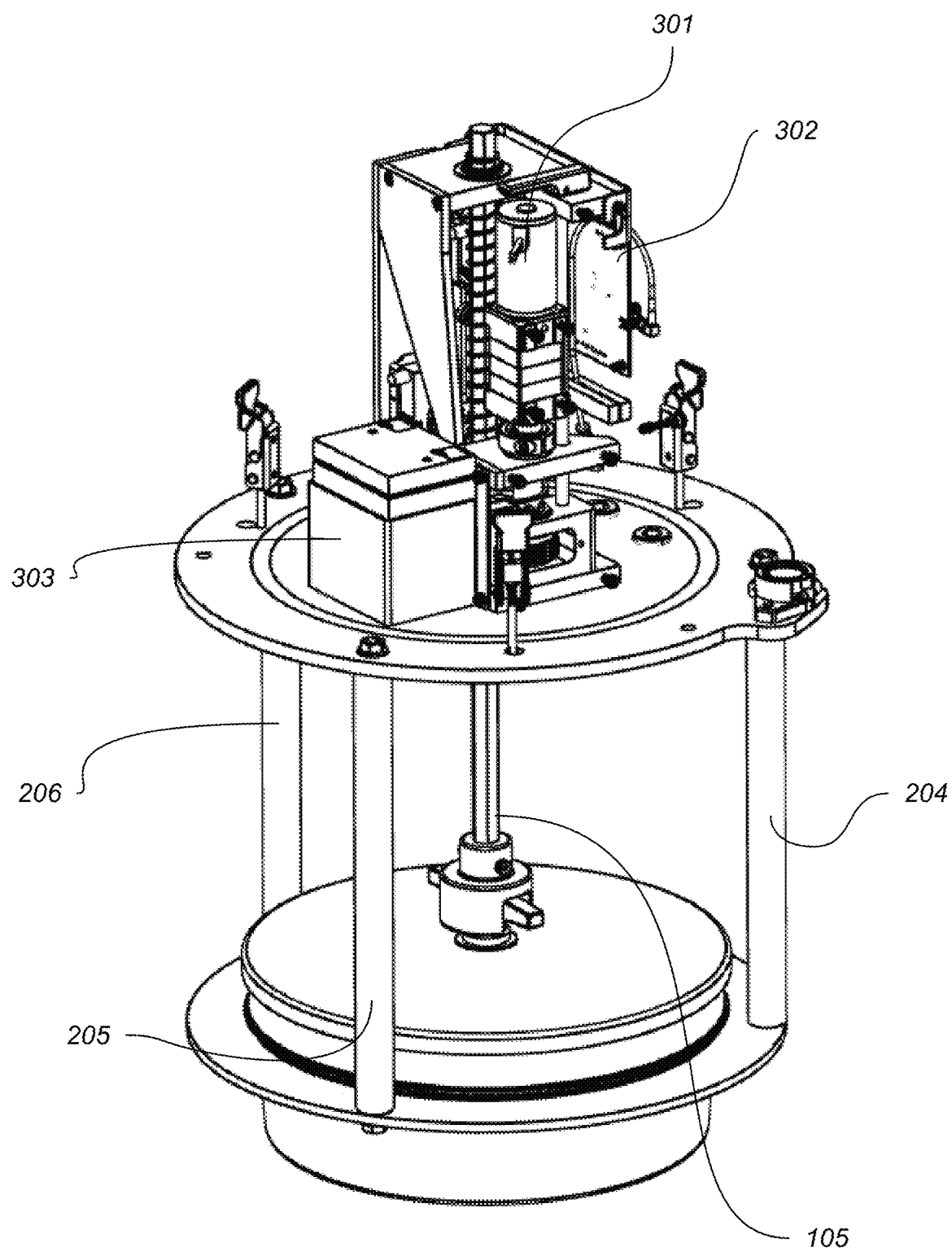
FIG. 3 is a perspective partial view of a valve location unit with valve assembly in one embodiment of a surge irrigation system.

The present invention in its various embodiments, some of which are depicted in the figures herein, is a surge irrigation system and method of use.

Referring now to FIGS. 1 through 5, the surge irrigation system includes one or more valve location units 100. Valve location unit comprises a housing 101 on a platform 102 of support members 103 and may or may not include a flood irrigation valve assembly 104. Inside of the housing 101 are located mechanics, electronics (e.g., a control unit), and power storage 203. Extending underneath the housing 101 and platform 102 is an elongate linkage 105 configured to open and close a valve assembly 104. The valve location unit may also include a solar power supply 106 and antenna 107. Each of these as well as their functionality and subcomponents are discussed in more detail below.

Across embodiments, valve location unit 100 has a powered actuator 301 that is connected to the elongate linkage 301. Linkage 103 may include a rod and/or gears 403, 404. The powered actuator 301 is further in communication with manual controls 501, 502 for opening and/or closing a valve assembly and/or an electronic, circuit board, and or computer with processor control unit 302 for operating the actuator 301 and other components of the valve location unit 100.

Any type of valve assembly may be suitable for use within the surge irrigation system and/or valve location unit 100, although the illustrated embodiment shows a Fresno® overflow-type valve. Valve assembly 101 is defined herein as any mechanism or structure that gates the flow of water. However, in preferred embodiments, the valve assembly is specifically of the flood irrigation category. The actuator 301 and/or control unit 302 may be powered through a battery 303 and/or solar system 106. In the illustrated embodiment, actuator 301, control unit 302, battery 303, and/or solar system 106 may be connected to and/or located on the platform 102 with a plurality of legs 204, 205, 206, 207 extending downward to the valve assembly 101.

Figure 4:
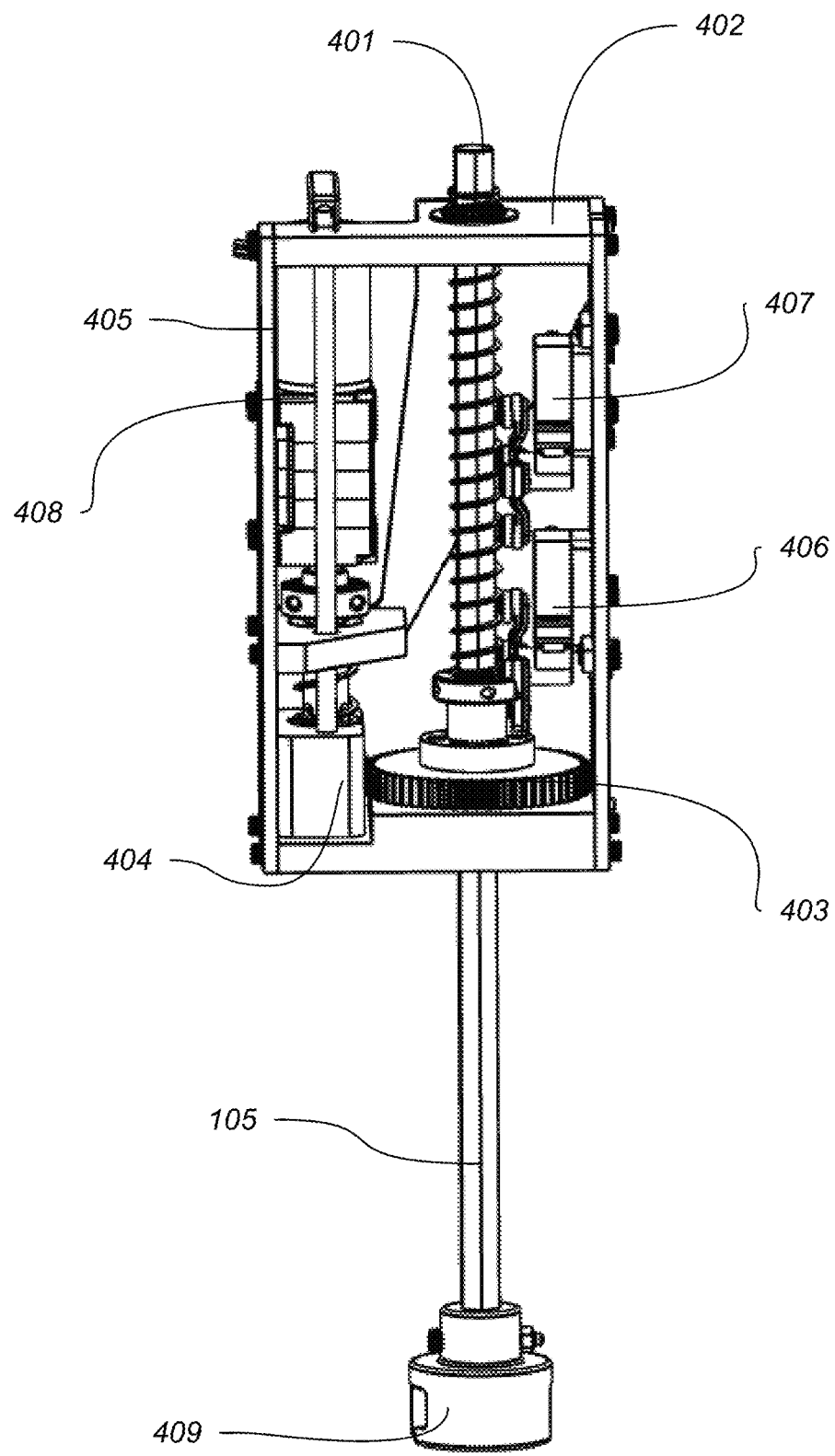
FIG. 4 is a front partial view of a valve location unit in one embodiment of a surge irrigation system.

Referring specifically now to FIG. 4, a partial view of a valve location unit 100 in one embodiment is shown. Elongate linkage 105 may include a rotatable elongate rod 401 that extends through a subhousing 402, a first rotatable gear 403 located along the rod 401 within the subhousing 401, the first gear 403 in communication with a rotatable second gear 404, which in turn is in communication with the powered actuator 405. Generally speaking, the elongate linkage 105 is oriented along a longitudinal axis that is roughly perpendicular to the ground. The configuration and placement of the elongate linkage may facilitate fitment with wrenches and manual operation, by, for example, having an exposed section of multifaceted rod above the subhousing, such as is shown in the illustrated embodiment of FIG. 4.

Figure 5:
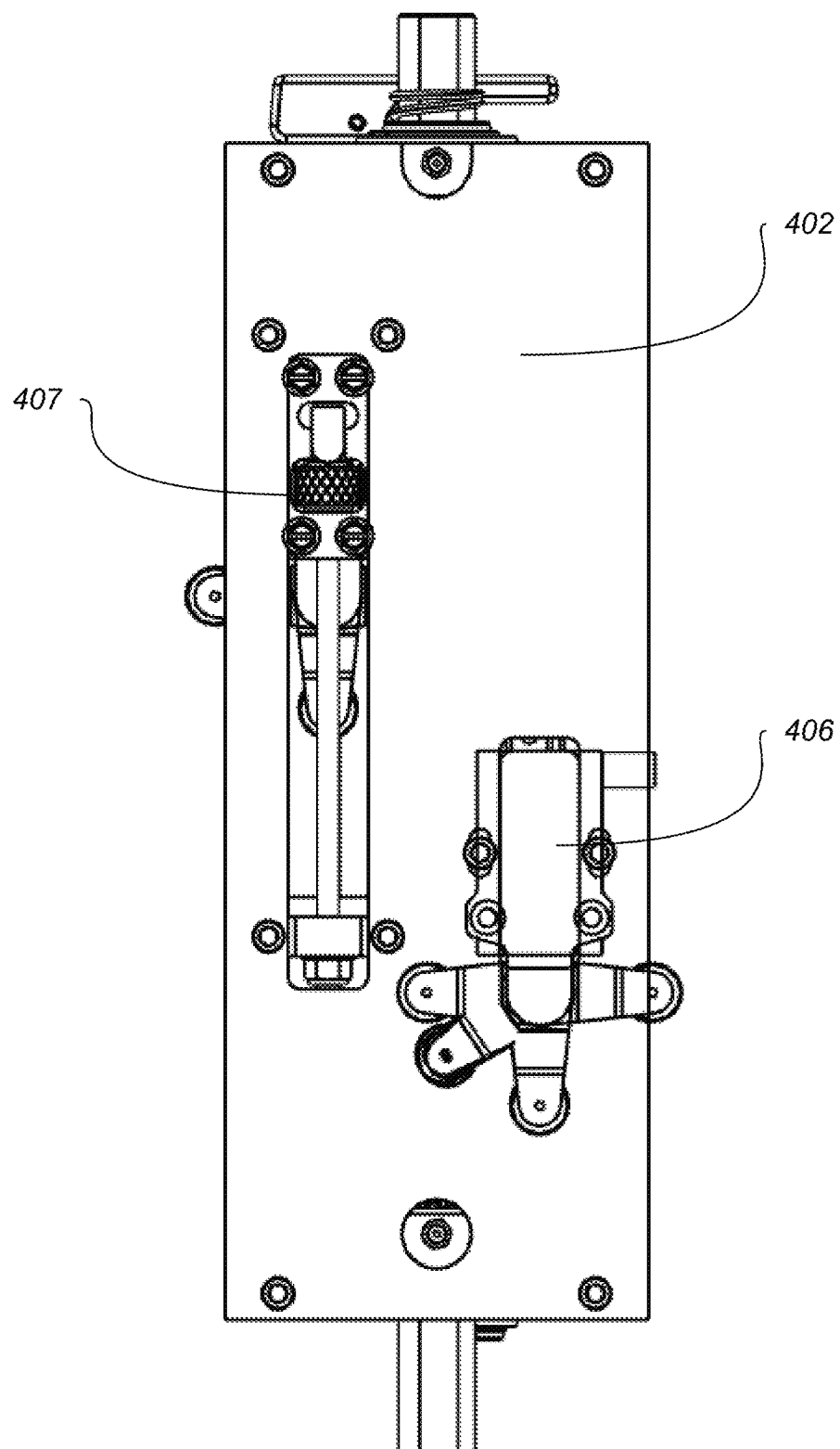
FIG. 5 is a side partial view of a valve location unit in one embodiment of a surge irrigation system.

Referring now to FIGS. 4 and 5, the valve location unit may include one or more manual controls 406, 407 to either manually initiate powered linkage operation and/or to adjust the linkage operation to alternatively facilitate powered and manual operation and/or rotation of the linkage 105. For example, a first manual control 406 may open and/or close the valve assembly through the powered actuator 405. A second manual control 407 may decouple the linkage 105 from the powered actuator 405 to enable a user to manually open and/or close the valve assembly 101 engaging a wrench (or similar tool) with the linkage 105. Valve location unit may have a guide rod 408.

The control unit 302 of the valve control unit 100 may include a printed circuit board (PCB), computer with processor, and means for wirelessly transmitting data and/or instructions to and from the control unit through any number of devices and/or technologies including the internet and/or one or more mobile devices. In one example, control unit 302 may include long range Bluetooth such as a LoRa node and/or one or more base stations that act as a gateway to the internet and/or mobile devices. In other embodiments, the surge irrigation system may include a base station that is separate from the control unit 302 and/or valve location unite. Many different means of achieving wired and/or wireless transmission of data and/or instructions to and from the control unit may be suitable and known to one skilled in the art.

Figure 6:
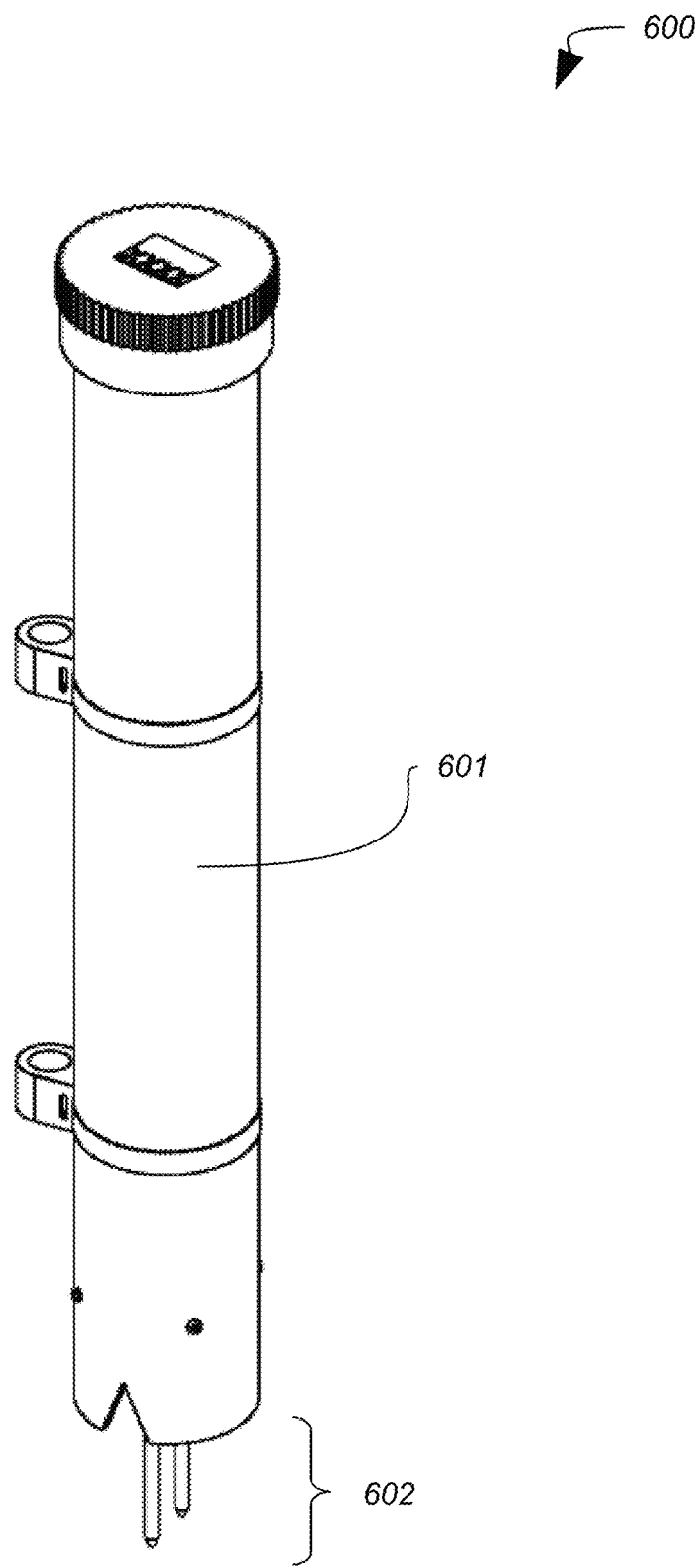
FIG. 6 is a perspective view of a moisture sensor in one embodiment of a surge irrigation system.
Figure 7:
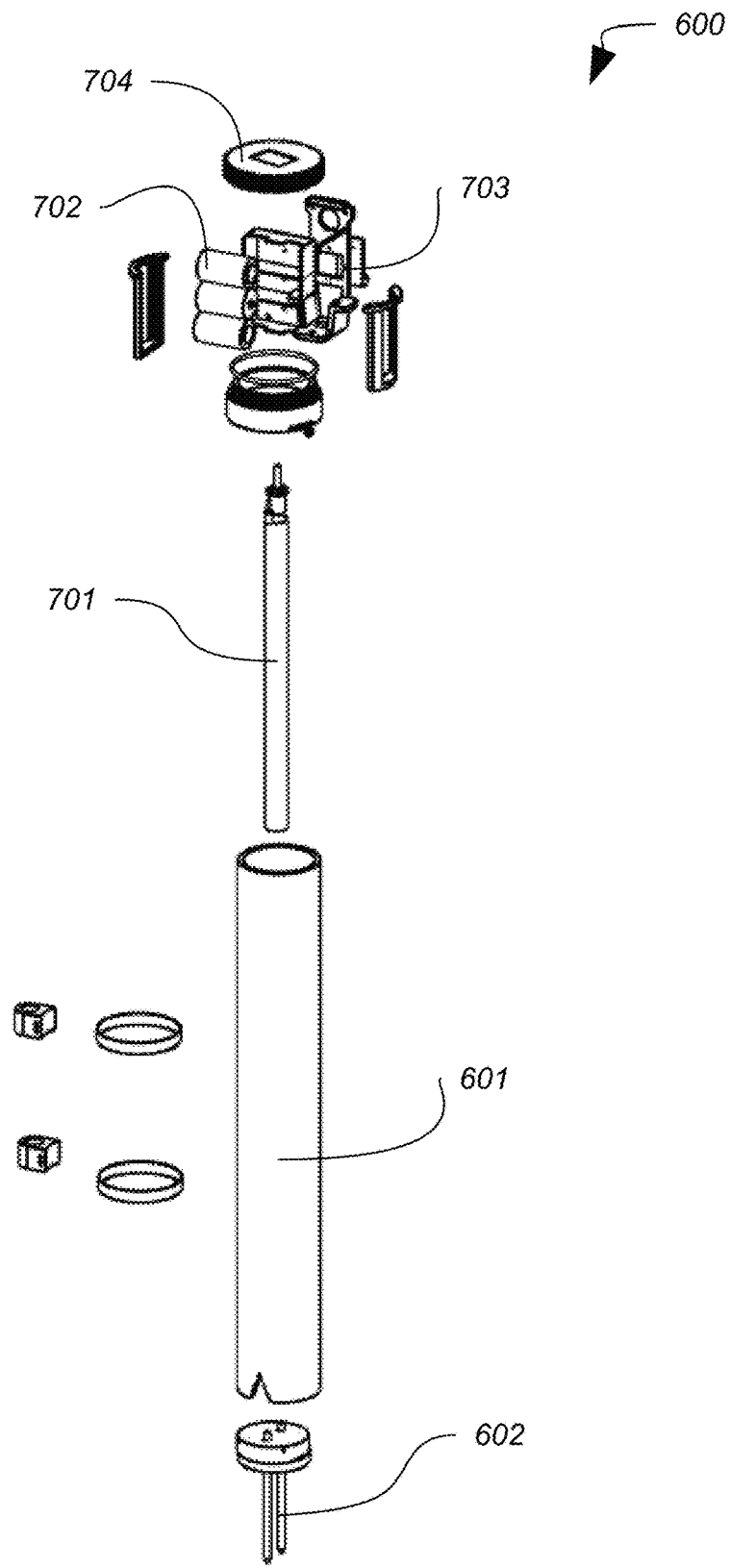
FIG. 7 is an exploded view of a moisture sensor in one embodiment of a surge irrigation system.

Referring now to FIG. 6, the surge irrigation system may also include a moisture sensor unit 600 configured to detect, for example, soil moisture information as electrical resistance and then transmit soil moisture information as feedback within the surge irrigation system. The moisture sensor unit 600 is configured to be placed in a field location to detect soil moisture and provide feedback to the surge irrigation system. The moisture sensor unit 600 is comprised of a tubular housing 601 and probe 602. Referring to FIG. 7, the tubular housing houses an antenna 701, a power supply 702, and wireless transmission means for transmitting soil moisture information. In the illustrated embodiment, the wireless transmission means is a printed circuit board (PCB) with a long-range Bluetooth such as a LoRa node. In operation (as through the modes and controls as described below) the system scans for sensor feedback, as, for example, an indicator of water presence. If water is present, or if another soil moisture threshold setting is reached, the surge irrigation system may cause a valve control unit to implement predetermined user directions. Such directions may include an immediate changing of the water to another irrigation area, or a delayed change of water (for example, a user defined delay). Subsequent surges within are negated and the dike is considered to be complete at that point.

Figure 8:
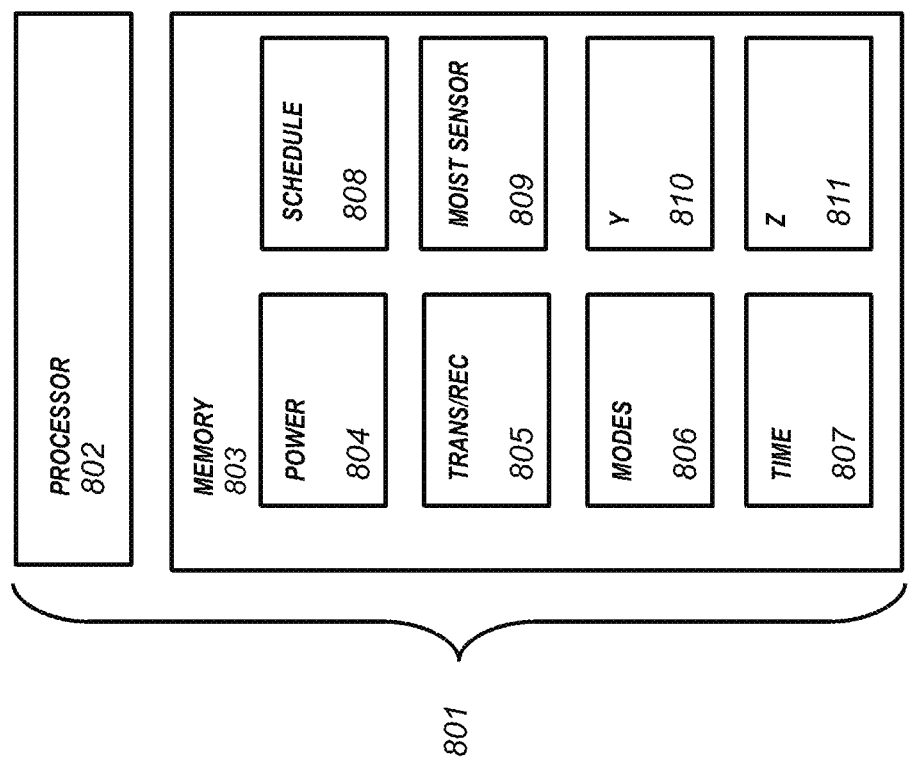
FIG. 8 is a block diagram of a processor with memory in one embodiment of a surge irrigation system.

Referring now to FIG. 8, in addition to means for transmitting data and/or instructions, the surge irrigation system may include a computer 801 with processor 802 and memory 803 with one or more modules to operate the control unit 302 and various functions and components of the valve location unit. For example, memory 803 may include one or more modules for: (1) managing the power of the unit, including powering the unit on and/or off and managing battery and/or solar power 804; (2) initiating, sending, or receiving information from the transceiver/receiver means 805; (3) operating the system within predetermined modes, including modes for traditional irrigation methods, surge irrigation methods, scheduled operation, timed operation, degree of valve open and/or close, etc. 806; (4) timing irrigation duration 807; (5) for scheduling irrigation 808; (6) for soliciting soil moisture information from the moisture sensor and/or initiating operations of the valve location unit based on information from the soil moisture sensor; and (7) any other number of operations 810, 811. In certain embodiments, the computer with process may be a mobile device to remotely access the surge irrigation system.

Figure 9:
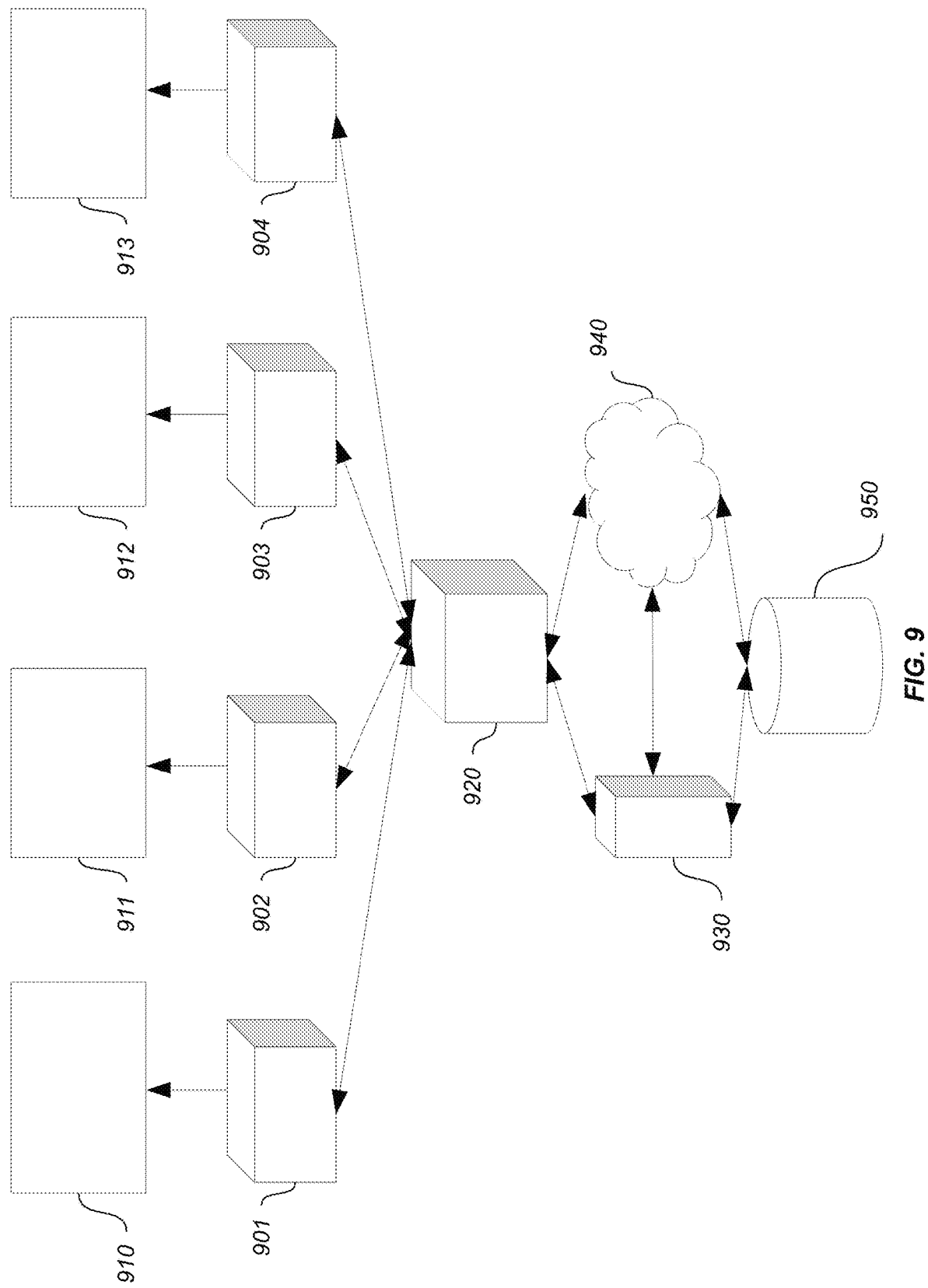
FIG. 9 is a block diagram of one embodiment of a surge irrigation system.
Figure 11:
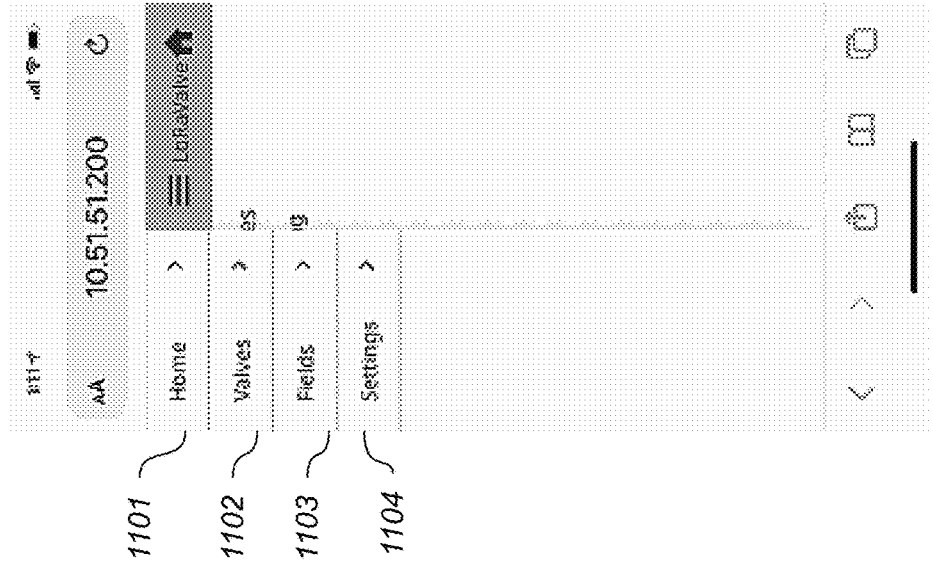
FIG. 11 is a second user interface in one embodiment of a surge irrigation system.

Referring now to FIG. 9, use of valve location units within a broader system is shown. Within the system, a plurality of units 901, 902, 903, 904 may be deployed, each unit independently operable to surge irrigate a respective and corresponding irrigation area (910, 911, 912, 913). Plurality of units 901, 902, 903, and 904 may be in communication with a local network and/or base station 920 for facilitating the transmission of data and/or instructions to and from each unit. Local network and/or base station 920, in turn, may be in communication with one or more mobile devices 930 and/or the internet 940. The one or more mobile devices 930 and/or internet 940 may be in communication with a database 950 containing information from irrigation areas, surge irrigation system units, users, mobile devices, and/or the internet.

Figure 10:
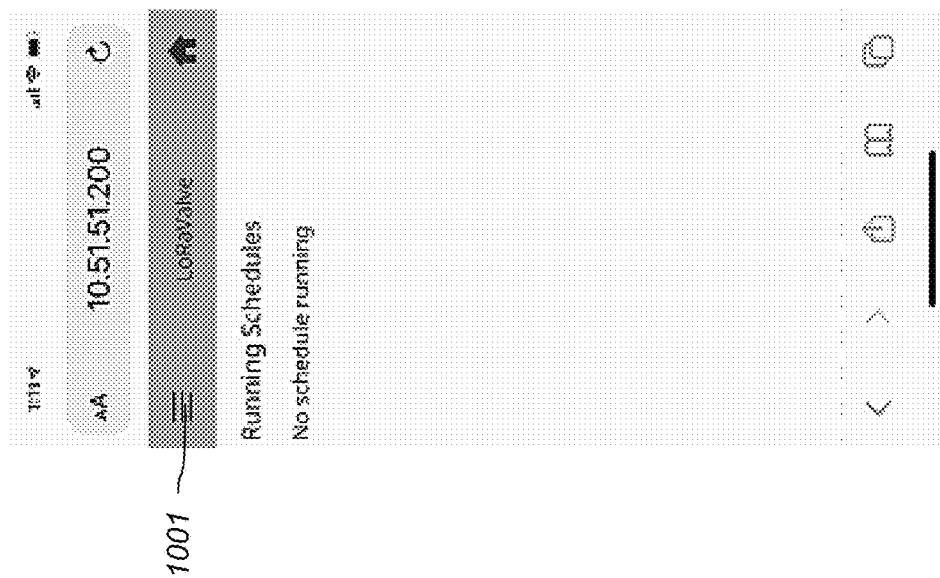
FIG. 10 is a first user interface in one embodiment of a surge irrigation system.
Figures 12, 13:
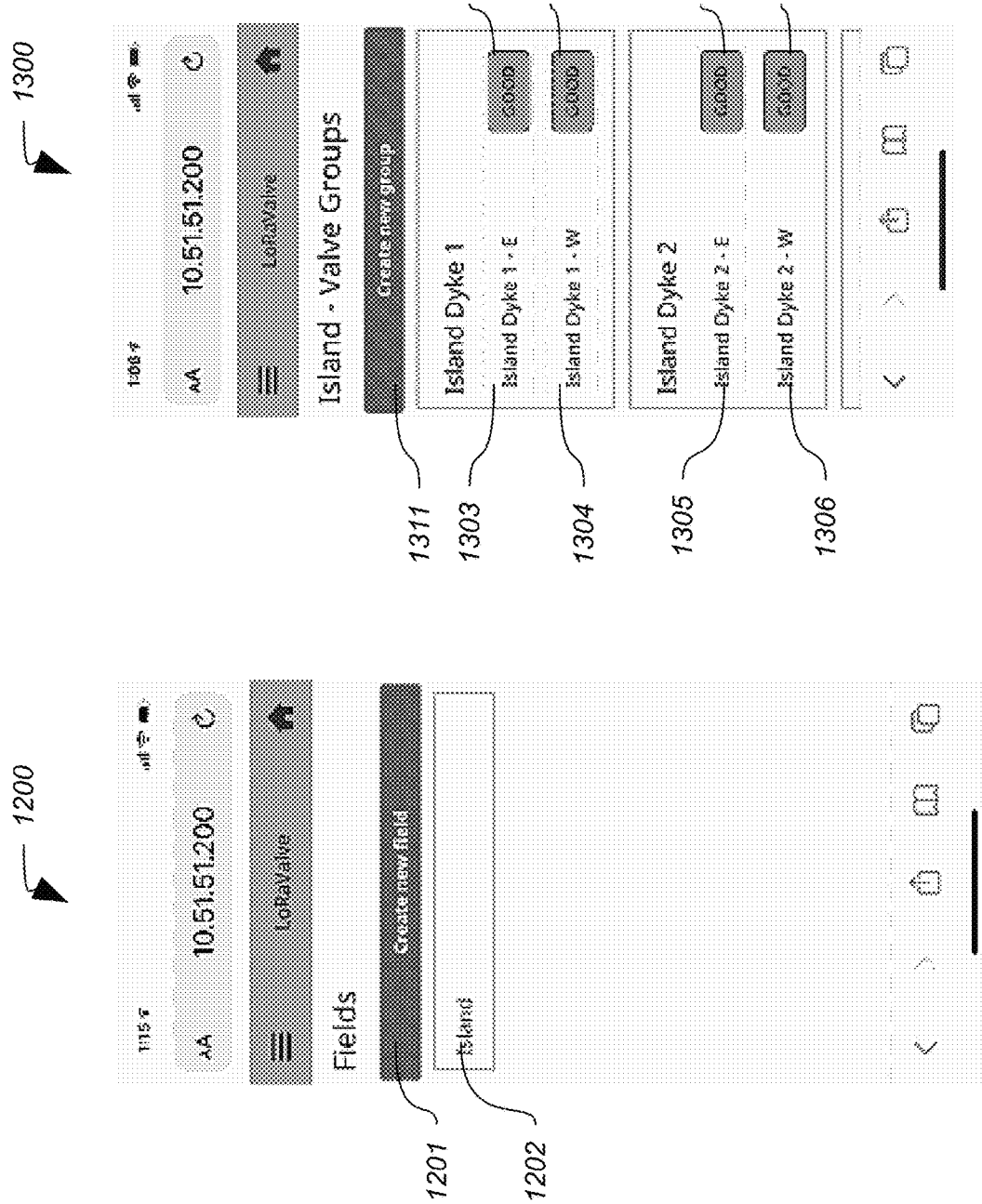
FIG. 12 is a third user interface in one embodiment of a surge irrigation system.
FIG. 13 is a fourth user interface in one embodiment of a surge irrigation system.
Figure 17:
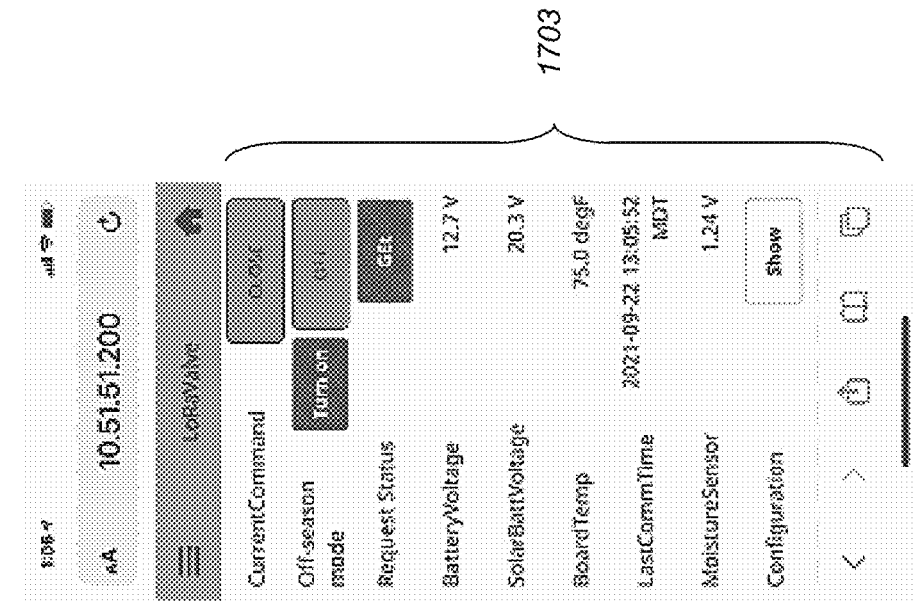
FIG. 17 is an eighth user interface in one embodiment of a surge irrigation system.
Figure 16:
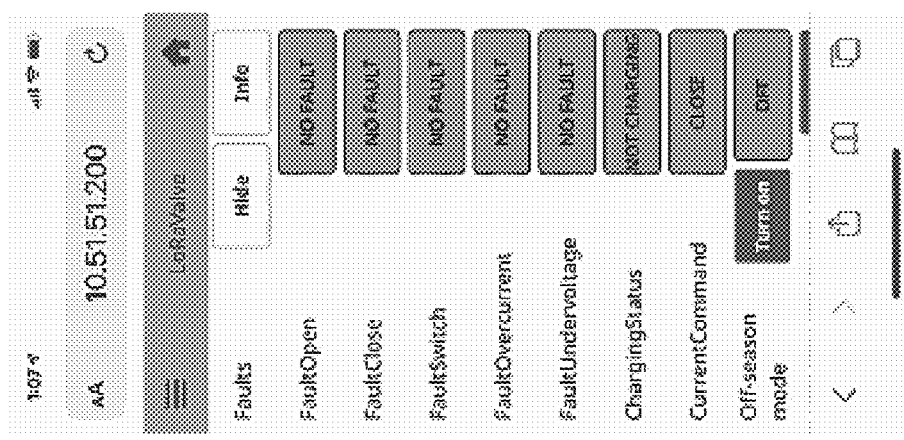
FIG. 16 is a seventh user interface in one embodiment of a surge irrigation system.
Figures 18, 19:
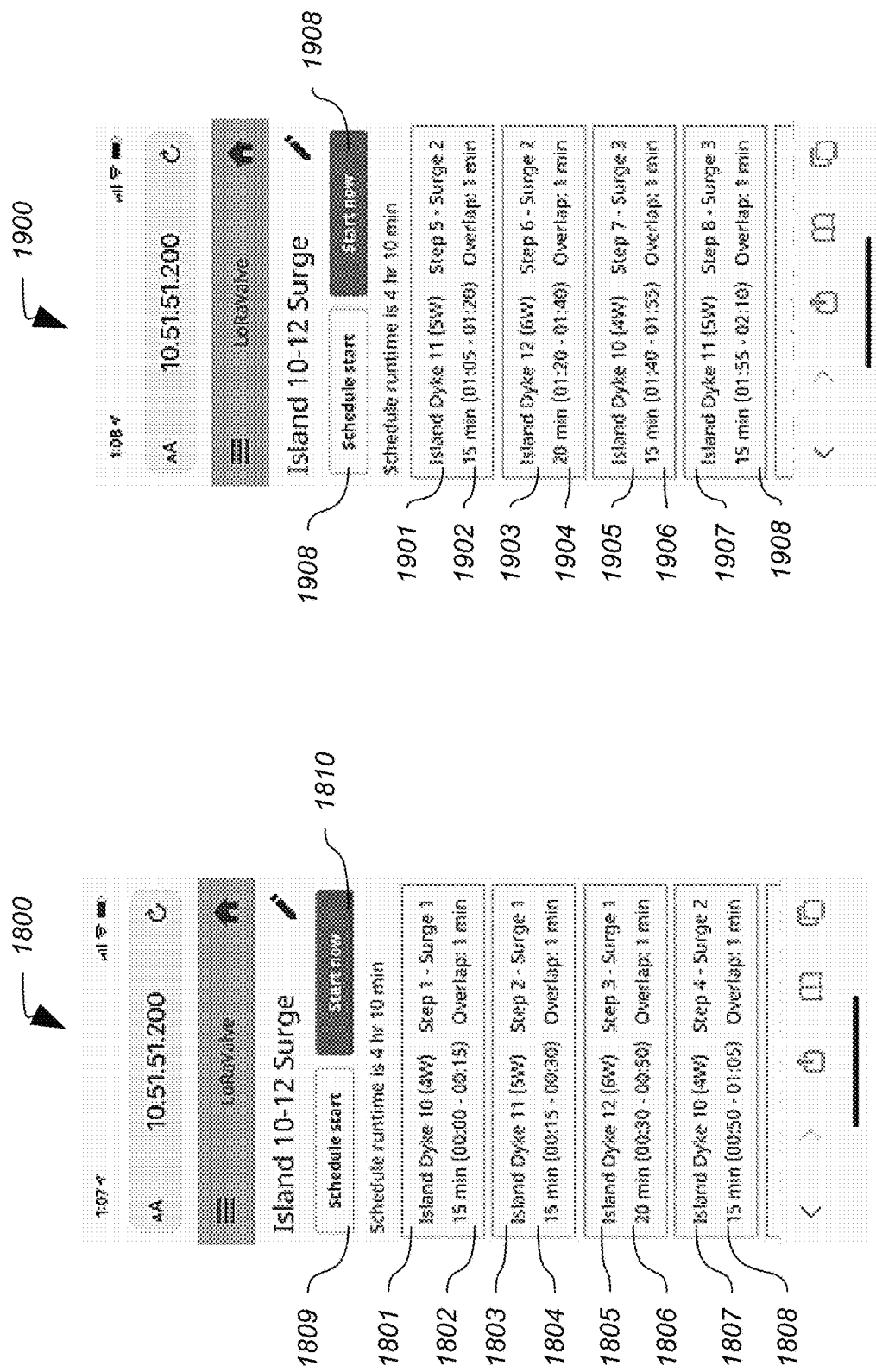
FIG. 18 is an eighth user interface in one embodiment of a surge irrigation system.
FIG. 19 is an eighth user interface in one embodiment of a surge irrigation system.

Referring now to FIGS. 10 through 23, various user interfaces, controls, and modes in a mobile application implementing one embodiment of a surge irrigation system are shown. FIG. 10 is a base screen with a dropdown menu 1001. Dropdown menu 1001 contains submenus for "Home" 1101, "Valves" 1102, "Fields" 1103, and "Settings" 1104. The "Fields" submenu 1103 allows a user to delineate one or more specific irrigation areas (i.e. fields). Clicking a delineated specific irrigation area 1102 leads to a submenu 1100 that allows a user to create 1311 valve groups 1301, 1302 that delineate sub-irrigation areas 1301, 1302 by field, such as may exist between dikes in the irrigation area. Each sub-irrigation area 1301, 1302 may be assigned one or more valve location units (e.g, A, B, C, D) corresponding to sub-sub-irrigation areas 1303, 1304, 1305, 1306. Status indicators may signal the functional status of each valve location unit 1307, 1308, 1309, 1310.

Clicking a valve group (e.g., 1301) leads to a submenu 1400 specific to a valve group 1301. This submenu 1400 further displays surge irrigation system units 1401, 1402 assigned to the valve group 1301, and provides buttons 1403, 1404 for opening and/or closing the same, as well as various status indicators 1406, 1407 for each surge irrigation system unit. The "Valves" submenu 1102 leads to specific screens (FIGS. 14-15) for each surge irrigation system unit, as well as buttons for opening and/or closing the same 1501, 1502, and various status indicators 1503.

From a "Fields" submenu 1103, a user may also create and/or access scheduled surge irrigation programs for fields, surge irrigation units, valve groups, and irrigation areas. The illustrated embodiment shows such a program by sub-irrigation areas (e.g. dyke) 1801, 1803, 1805, 1807, 1901, 1903, 1905, and 1907, by sequence and surge time length 1802, 1804, 1806, 1808, 1902, 1904, 1906, 1908. Program submenus also provide buttons for scheduling start times 1809, 1808 and/or manually initiating programs 1810 and 1908.

Figure 20:
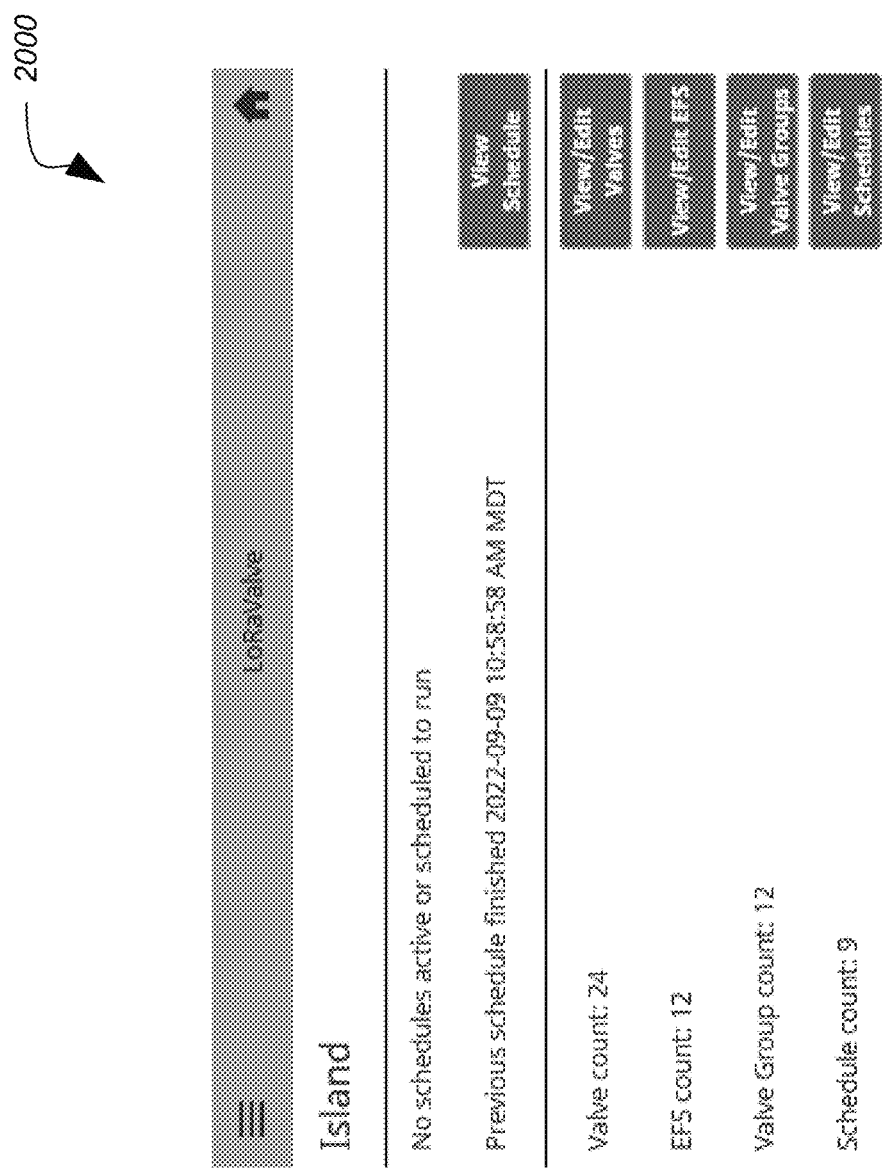
FIG. 20 is an ninth user interface in one embodiment of a surge irrigation system.
Figure 21:
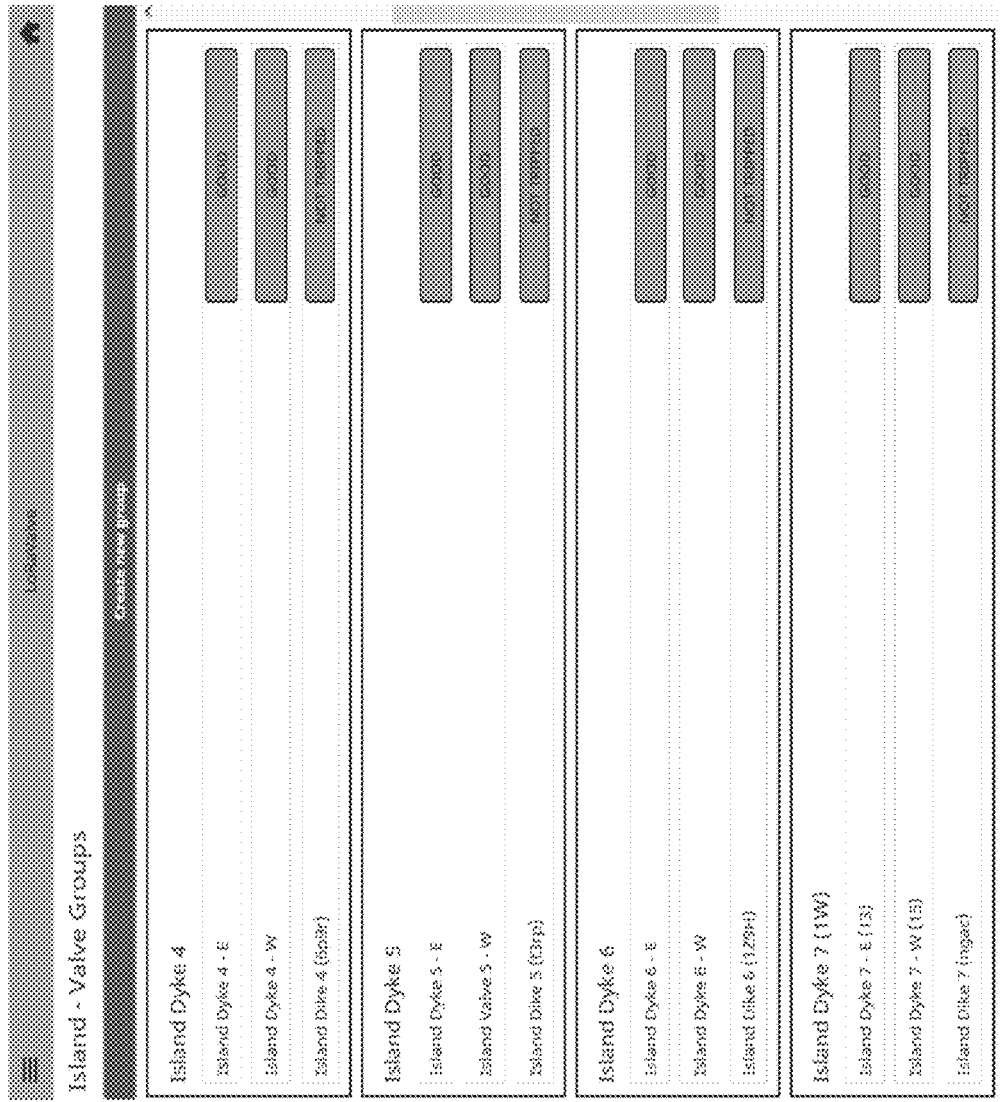
FIG. 21 is a tenth user interface in one embodiment of a surge irrigation system.
Figure 22:
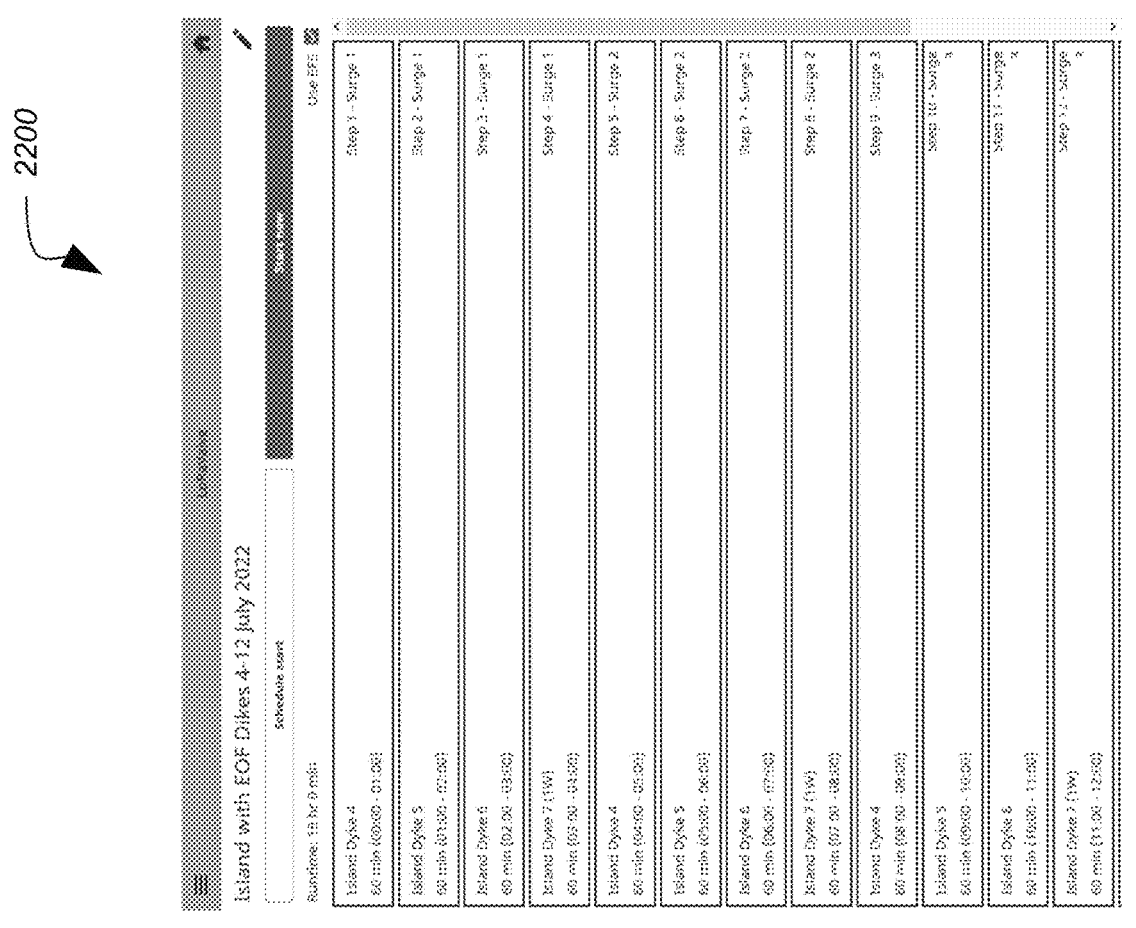
Figure 23:
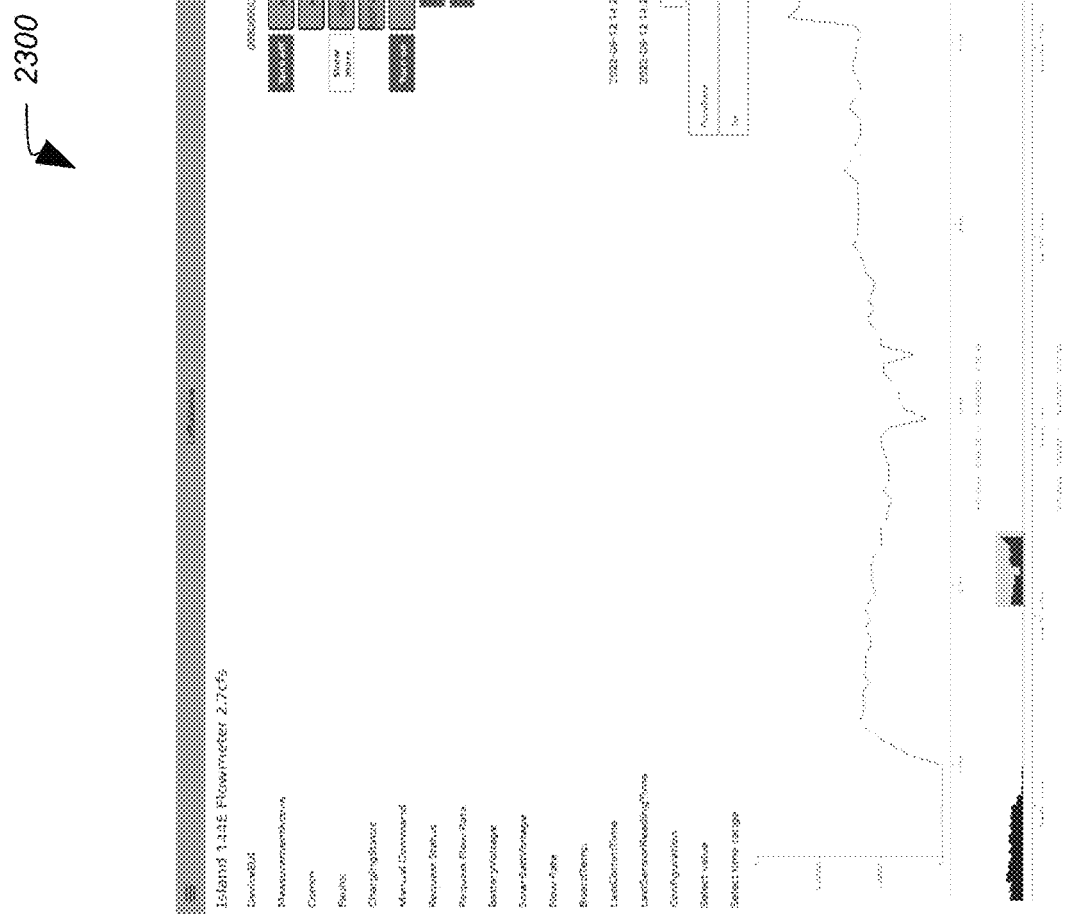
FIG. 23 is a twelfth user interface in one embodiment of a surge irrigation system.

Referring now to FIGS. 20-23, separate, but similar embodiments of various user interfaces, controls, and modes in a mobile application implementing one embodiment of a surge irrigation system are shown. With reference to the above, FIG. 20 shows a main page for specific field with options and functionality. FIG. 21 shows groups of valves in a field with options and functionality. FIG. 22 shows scheduling features in a field with options and functionality. FIG. 23 shows an exemplary schedule implementing a surge irrigation program within a filed of areas subdivided by dikes.

Figure 24:
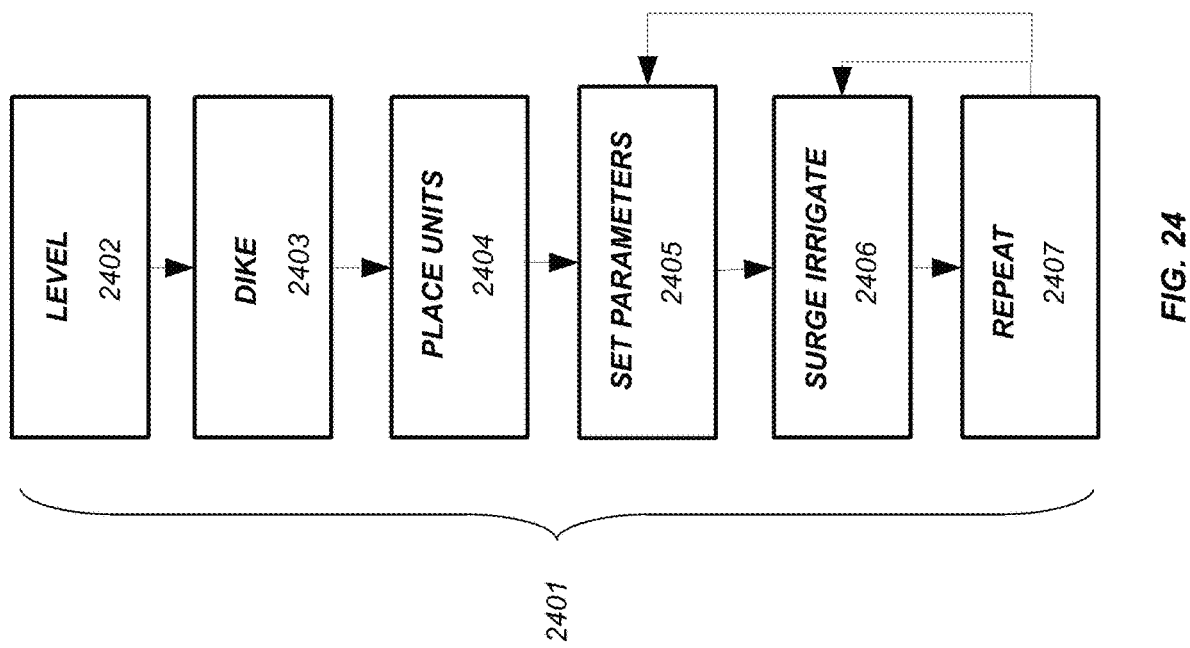
FIG. 24 is a flow diagram of one method of using the surge irrigation system in one embodiment.

Referring now to FIG. 24 a method of using the surge irrigation system 2401 is shown. In order to optimize the system, the irrigation area must be leveled 2402 so that water pulses from surge events can move efficiently over irrigation areas. Dikes delimiting irrigation areas must be made 2403. One or more valve control units, as described above, are placed in proximity to a subdivided irrigation area 2404. A user proceeds to select and set the parameters (e.g., schedule, time, pulse frequency and duration, irrigation area, etc.) for surge irrigating each subdivided area 2405. A user initiates the system to surge irrigate according to the set parameters 2406. The steps of selecting and setting parameters and/or initiating the system to surge irrigate are repeated 2407. Additionally, a base station may be placed to relay one or more of data and instructions between the control unit, a cloud, and a user. Furthermore, a moisture sensor may be provided and placed in an irrigation area to provide feedback information within the surge irrigation system.

In preliminary testing, use of the system in the arid West has shown increased alfalfa yields of up to 50% using 50% less water than traditional flood irrigation methods. Significantly, installation and operation of the surge irrigation system described may be done at a fraction of the cost of existing systems, in some cases just 20% of such costs.

So, configured, the invention includes a surge irrigation system and method of use. The problem of achieving a new, cost-effective aftermarket solution that provides ease of conversion and operation to implement surge irrigation methods is solved.

The present invention may be embodied in other specific forms without departing from its spirit or essential characteristics. For example, housing 101 may have first 201 and second 202 subparts. In another example, elongate linkage 105 and/or rod 401 may incorporate a riser wrench 409 and/or other riser and/or valve connection at one end. In yet another example, moisture sensor unit may have a cap with digital display 704 and/or internal control unit with onboard electronics or firmware 703. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A surge irrigation system comprising:
   a valve location unit with
      a linkage configured to open and close a valve assembly;
      a powered actuator connected to the linkage;
      a control unit connected to the powered actuator, the control unit configured to wirelessly receive instructions to operate the powered actuator;
   one or more computers with a processor and memory with one or more modules to operate the control unit, wherein the one or more modules to operate the control unit comprise:
      a power management module for managing power in the surge irrigation system;
      an instruction and data module for receiving instructions and sending data; and
      an operation module for operating the surge irrigation system within predetermined modes, including timing and duration of surge irrigation within one or more delineated areas of land; and
   the surge irrigation system configured to surge irrigate the one or more delineated areas of land.

2. The surge irrigation system of claim 1, further comprising one or more moisture sensors configured to wirelessly transmit moisture information as feedback within the surge irrigation system.

3. The surge irrigation system of claim 1, wherein the valve assembly is beneath and connected to the linkage.

4. The surge irrigation system of claim 1, further comprising a base station in communication with the control unit and configured to relay one or more of data and instructions between the control unit, a cloud, and a user.

5. The surge irrigation system of claim 1, wherein at least one of the one or more computers is a mobile device.

6. A surge irrigation system comprising:
a valve location unit configured for location above a single flood irrigation valve assembly, the valve location unit having
an elongate linkage with a rod configured to rotatably open and close the single flood irrigation valve assembly, the elongate linkage partially located within a plurality of support members;
a powered actuator connected to the linkage; and
a control unit connected to the powered actuator, the control unit configured to wirelessly receive instructions to operate the powered actuator; and
a power supply connected to the powered actuator and control unit, the power supply comprising a solar panel and a battery;
one or more computers with a processor and memory with one or more modules to operate the control unit, wherein the one or more modules to operate the control unit comprise:
a power management module for managing power in the surge irrigation system;
an instruction and data module for receiving instructions and sending data; and
an operation module for operating the surge irrigation system within predetermined modes, including timing and duration of surge irrigation within one or more delineated areas of land; and
the surge irrigation system configured to surge irrigate the one or more delineated areas of land.

7. The surge irrigation system of claim 6, further comprising a moisture sensor configured to transmit moisture information as feedback within the surge irrigation system.

8. The surge irrigation system of claim 6, further comprising a base station configured to relay one or more of surge irrigation data and surge irrigation instructions between the control unit, a cloud, and a user.

9. The surge irrigation system of claim 6, wherein the single flood irrigation valve assembly is beneath and connected to the linkage.

10. The surge irrigation system of claim 6, the valve location unit further comprising a means for manually opening and closing the valve assembly.

11. A surge irrigation system comprising:
a plurality of valve location units, each valve location unit configured for location above a single valve assembly and having
an elongate linkage configured to open and close the single valve assembly;
a powered actuator connected to the linkage and configured to rotatably open and close the single valve assembly; and
a control unit connected to the powered actuator, the control unit configured to wirelessly receive instructions to operate the powered actuator;
a power supply connected to the powered actuator and control unit, the power supply comprising a solar panel and a battery;
one or more computers with a processor and memory with one or more modules to operate the control unit, wherein the one or more modules to operate the control unit comprise:
a power management module for managing power in the surge irrigation system;
an instruction and data module for receiving instructions and sending data; and
an operation module for operating the surge irrigation system within predetermined modes, including timing and duration of surge irrigation within one or more delineated areas of land; and
a surge irrigation mode wherein a user selects time and duration parameters for surge irrigating the one or more delineated areas of land in series;
a plurality of moisture sensors configured to transmit moisture information as feedback within the surge irrigation system; and
one or more base stations in communication with the control units and configured to relay one or more of surge irrigation data and surge irrigation instructions between control units, a cloud, and a user;
the surge irrigation system configured to surge irrigate the one or more delineated areas of land.

12. The surge irrigation system of claim 11, wherein one or more of the one or more computers is a mobile device.

* * * * *